L. D. WRIGHT.
STAND FOR CAMERAS.
APPLICATION FILED JULY 14, 1921.
1,418,898.
Patented June 6, 1922.
2 SHEETS—SHEET 2.
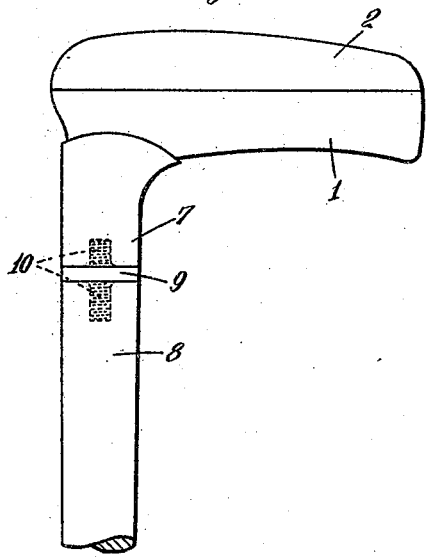
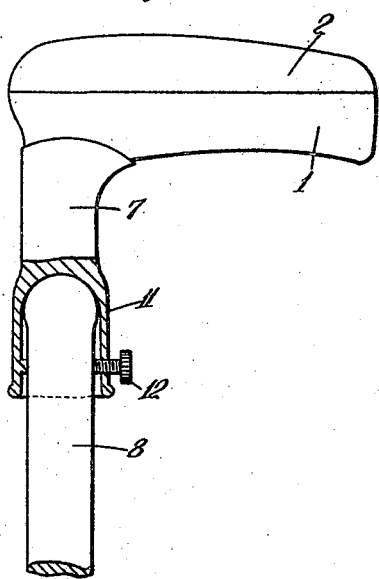
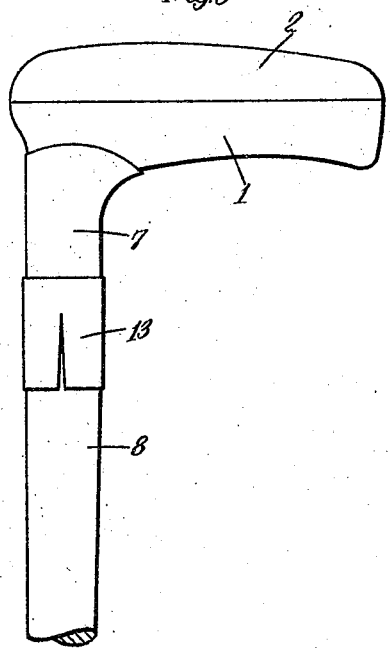
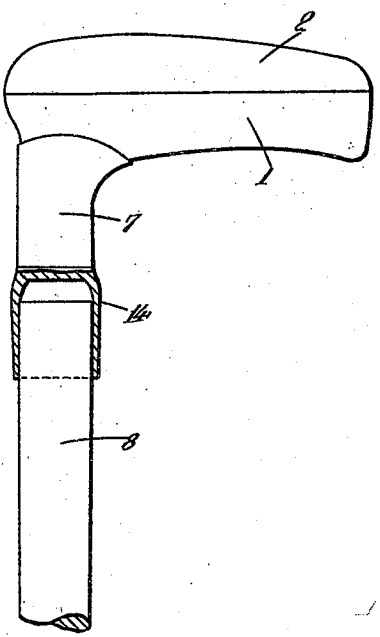

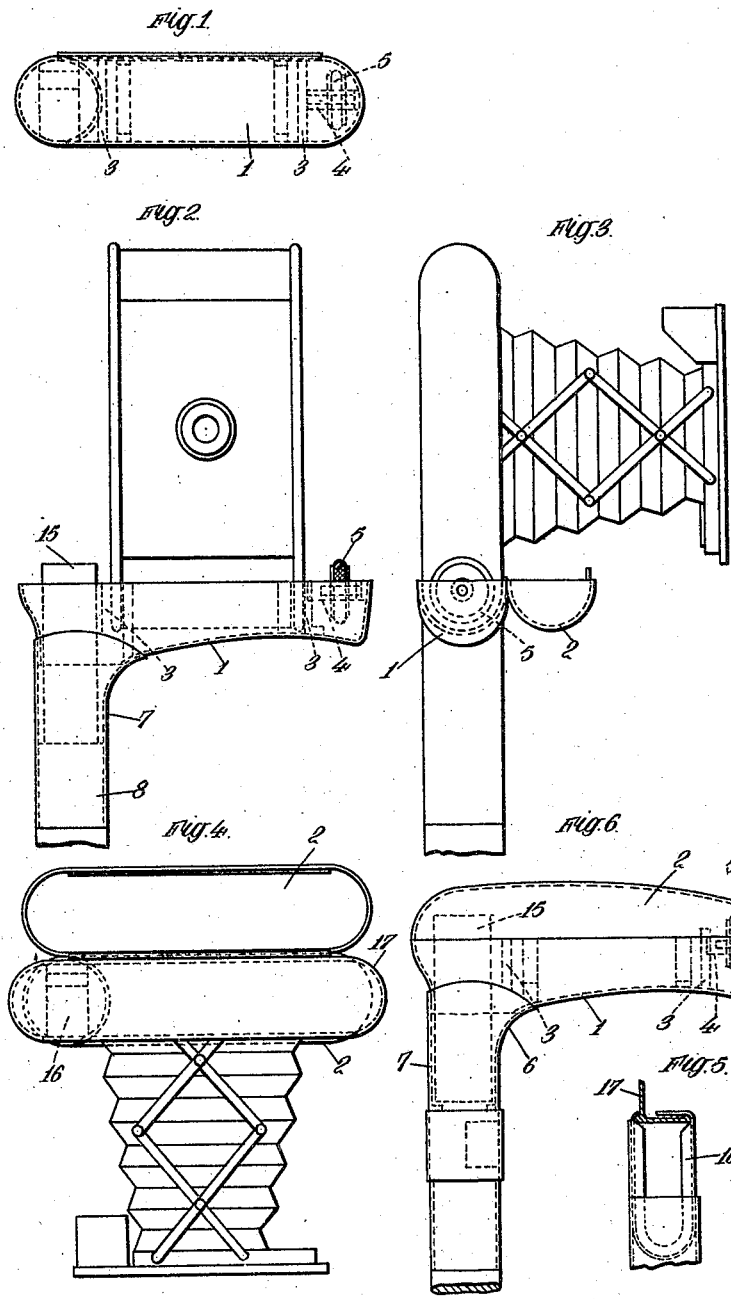

UNITED STATES PATENT OFFICE.

LESLIE DOUGLAS WRIGHT, OF LONDON, ENGLAND.

STAND FOR CAMERAS.

1,418,898. Specification of Letters Patent. Patented June 6, 1922.

Application filed July 14, 1921. Serial No. 484,708.

*To all whom it may concern:*

Be it known that I, LESLIE DOUGLAS WRIGHT, a subject of the King of Great Britain, residing at 8 Cavendish Place, London, in the county of Middlesex, England, have invented certain new and useful Improvements in or Relating to Stands for Cameras, of which the following is a specification.

This invention has reference to stands for cameras and particularly small cameras of the kind usually referred to as pocket cameras. Cameras of this kind while having the advantage of lightness and of being convenient to carry about are difficult to hold sufficiently steadily in the hands while a time exposure is being made. On the other hand stands at present known such as these of the tripod type are comparatively bulky and the necessity to carry one about detracts from the special advantage of compactness and convenience possessed by a pocket camera. It is the object of this invention to provide means for supporting or holding a small pocket camera, which means shall be compact, light and convenient.

In accordance with the invention, I provide a device adapted to receive a small or pocket camera and provided with means for securing the camera in position therein and with means for attachment to a stick, for which latter purpose the device may be formed or provided with a tubular boss or projection adapted to fit into or receive a stick such as a walking stick or umbrella stick or the like, or a spring clip, screw coupling, or other means for attaching the device to a stick may be provided. The device is preferably so formed that when not in use as a support for a camera it may form the handle of a walking stick or umbrella. The device may be shaped to correspond with the normal outline of a straight walking stick or umbrella handle and may be made of metal, wood or any other suitable material.

The device comprises a hollow casing into which the camera may be placed and retained firmly in position by screws or springs and is preferably provided with a lid or cover hinged or otherwise attached thereto so that when the devise is not needed to serve as a stand for a camera it has the normal outline of a walking stick or umbrella handle.

In order that the invention may be clearly understood and readily carried into effect I will now proceed to describe the same more fully with reference to the accompanying drawings in which:—

Figure 1 is a plan view of one form of the device.

Figure 2 is a side view and Figure 3 a rear view showing a camera in position.

Figure 4 is a plan view showing a camera held in a position at right angles to that shown in Figure 2.

Figure 5 is a detail showing a spring clip used for retaining the camera in the position shown in Figure 4.

Figure 6 is a side elevation showing the lid or cover closed and the device attached to a stick.

Figures 7, 8, 9 and 10 are side elevations showing alternative means for attaching the device to a stick.

The device consists of a hollow casing 1 having a lid or cover 2 hinged or otherwise attached thereto. The casing 1 has formed therein walls or partitions 3 serving to position the camera, the base of which, as shown in Figures 1, 2 and 3 may be located between the said walls 3, a set screw 4 or its equivalent operable by the knurled wheel 5 being provided to firmly hold it in position. At the opposite end to the set screw 4 the casing 1 is provided with a tubular boss or projection 6 into which a stick may be inserted or, as shown on the drawings, a sheath 7, preferably of metal, is sweated on or otherwise secured to said boss to receive a stick 8 as shown in Figure 2 or the said sheath 7 may be formed for holding or attachment to a stick in a variety of ways, some of which are indicated by way of example in Figures 7 to 10. Thus in Figure 7 a collar 9 is provided with pins 10 adapted to screw into recesses in the stick and sheath; these pins 10 may either be threaded as shown or may be plain and fit tightly in the said recesses. In Figure 8 the sheath 7 carries or is extended to form a cap 11 adapted to receive the end of the stick 8, a set screw 12 being provided to hold the stick firmly in the cap. This form of the device is particularly adapted to receive the knob end of a walking or umbrella stick.

In Figure 9 the stick is held by a split sheet metal collar 13 and in Figure 10 which is also specially adapted to receive the knob end of a walking stick the knob is held by an expansible sheath 14 of rubber or other suitable material.

If desired the rear end of the device may be hollowed out to provide a housing for a spare film spool 15 as shown in Figures 2 and 6, or the housing may contain a spring clip 16 adapted to receive the frame of a camera 17 (as shown in Figures 4 and 5) when the camera is turned on its side at right angles to the position shown in Figures 2 and 3. By this means the device is adapted to hold the camera while views are taken either way of the film.

It will be noted that the camera holding device, when the lid 2 is closed, has the normal outline of a walking stick or umbrella handle and the invention contemplates the device either being permanently attached to and forming the handle of a walking stick or umbrella or forming a separate unit adapted to be carried in a pocket if desired and to be attached to a stick, as by any of the means illustrated in the drawings. It will be seen that by inserting the lower end of the stick into the ground the camera held within or by the device will be maintained quite steady while an exposure is being made.

What I claim and desire to secure by Letters Patent of the United States is:—

1. A device for supporting a small or pocket camera comprising a hollow casing having the normal outline of a walking stick or umbrella handle, the said casing having a movable lid or cover and internal walls or partitions between which the end of a camera may be positioned, and means for clamping the camera between said walls substantially as described.

2. A device for supporting a small or pocket camera comprising a hollow casing having the normal outline of a walking stick or umbrella handle, the said casing having a hinged lid and internal walls or partitions between which the end of a camera may be positioned, a set screw movable through an orifice in one of the said walls for firmly securing the camera in position and a knurled nut for operating the said set screw substantially as described.

3. A device for supporting a small or pocket camera comprising a hollow casing having the normal outline of a walking stick or umbrella handle, the said casing having a movable lid or cover and internal walls or partitions between which the end of a camera may be positioned, means within the hollow casing by which the camera may be supported upon its side, and means for clamping the camera between said walls substantially as described.

4. A device for supporting a small or pocket camera comprising a hollow casing having the normal outline of a walking stick or umbrella handle, the said casing having a movable lid or cover and internal walls or partitions between which the end of a camera may be positioned, means for clamping the camera between said walls, said device characterized by the fact that it is formed as a separate unit and is provided with means for attachment to any stick, substantially as described.

LESLIE DOUGLAS WRIGHT.